United States Patent
Fujimoto et al.

(10) Patent No.: US 7,414,815 B2
(45) Date of Patent: Aug. 19, 2008

(54) MAGNETIC HEAD ACTUATOR WITH CENTERED DEVIATION

(75) Inventors: Shinji Fujimoto, Kawasaki (JP);
Masato Shibuya, Kawasaki (JP);
Hisashi Kaneko, Kawasaki (JP);
Tsuneyori Ino, Kawasaki (JP); Yukihiro Komura, Kawasaki (JP); Mitsuhiro Izumi, Kawasaki (JP); Kei Funabashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/819,427

(22) Filed: Jun. 27, 2007

(65) Prior Publication Data
US 2007/0253114 A1  Nov. 1, 2007

Related U.S. Application Data

(62) Division of application No. 10/901,214, filed on Jul. 29, 2004, now Pat. No. 7,336,448.

(30) Foreign Application Priority Data
Feb. 27, 2004 (JP) .............................. 2004-054244

(51) Int. Cl.
*G11B 5/55* (2006.01)
*G11B 21/22* (2006.01)

(52) U.S. Cl. ............................ 360/264.7; 360/264.9
(58) Field of Classification Search .............. 360/264.3, 360/264.7, 264.9; 335/220
See application file for complete search history.

(56) References Cited

U.S. PATENT DOCUMENTS

| 5,329,267 A | * | 7/1994 | Endoh et al. ................. 335/222 |
| 5,541,792 A | | 7/1996 | Kinoshita et al. ........... 360/106 |
| 5,581,424 A | * | 12/1996 | Dunfield et al. .......... 360/256.2 |
| 5,621,591 A | | 4/1997 | Rahimi |

(Continued)

FOREIGN PATENT DOCUMENTS

JP  2001-035103  2/2001

(Continued)

OTHER PUBLICATIONS

European Search Report dated Apr. 29, 2008.

*Primary Examiner*—Brian E Miller
(74) *Attorney, Agent, or Firm*—Kratz, Quintos & Hanson, LLP

(57) ABSTRACT

A magnetic disk device comprises a magnetic disk in which a data zone is formed. An actuator has a voice coil and a head slider carrying a magnetic head, the actuator being swung to move the magnetic head over the disk between an innermost position of the data zone and an outermost position of the data zone. A magnet has a magnetization center and is opposed to the voice coil so that a voice coil motor which swings the actuator is formed, the magnet having a north pole and a south pole confronting each other via the magnetization center. The magnetic disk device is provided so that a deviation of a center of the voice coil from the magnetization center when the magnetic head is in the innermost position of the data zone is substantially equal to a deviation of the center of the voice coil from the magnetization center when the magnetic head is in the outermost position of the data zone.

4 Claims, 10 Drawing Sheets

U.S. PATENT DOCUMENTS

| | | | |
|---|---|---|---|
| 5,675,455 A | 10/1997 | Matsumoto | 360/106 |
| 5,764,441 A * | 6/1998 | Aruga et al. | 360/265 |
| 5,875,076 A * | 2/1999 | Hachiya et al. | 360/265 |
| 5,883,761 A * | 3/1999 | Kasetty et al. | 360/264.9 |
| 6,304,421 B1 * | 10/2001 | Brown | 360/264.8 |
| 6,445,548 B1 | 9/2002 | Sasaki et al. | 360/256.2 |
| 6,654,207 B2 * | 11/2003 | Hong et al. | 360/256.2 |
| 6,735,054 B2 * | 5/2004 | Ooi et al. | 360/264.9 |
| 6,921,999 B1 | 7/2005 | Stridsberg | 310/156.01 |
| 6,952,331 B2 * | 10/2005 | Chang | 360/264.7 |
| 7,148,777 B2 * | 12/2006 | Chell et al. | 335/306 |

FOREIGN PATENT DOCUMENTS

WO     WO 99/04388 A     1/1999

* cited by examiner

MAGNETIC HEAD ACTUATOR WITH CENTERED DEVIATION

This applications is a Divisional of prior application Ser. No. 10/901,214 filed on Jul. 29, 2004 now U.S. Pat. No. 7,336,448, the contents being incorporated herein by reference.

CROSS-REFERENCE TO RELATED APPLICATIONS

This application is based upon and claims the benefit of priority from the prior Japanese application No. 2004-054244, filed on Feb. 27, 2004, the entire contents of which are incorporated herein by reference.

BACKGROUND OF THE INVENTION

1. Field of the Invention

The present invention generally relates to a magnetic disk device, and more particularly to a magnetic disk device which includes an actuator moving the magnetic head between the innermost positions of the data zone of the magnetic disk and the outermost position of the data zone thereof.

2. Description of the Related Art

In a magnetic disk device that performs recording or reproduction of information to the magnetic disk, it is necessary to avoid wearing of the head slider (the magnetic head) by the contact between the head slider and the magnetic disk surface.

Therefore, the contact start-stop (CSS) method is adopted in which the head slider contacts the disk surface only at the time of non-operation of the magnetic disk device, and the head slider is raised over the surface of the magnetic disk during its rotation at the time of operation of the magnetic disk device (or the time of recording or reproduction of information).

In the magnetic disk device of the CSS method, the head slider which carries the magnetic head which performs recording or reproduction of information to the magnetic disk surface is raised by receiving the air flow which is created by the rotation of the magnetic disk at the time of operation of the magnetic disk device.

And when recording or reproducing information to the magnetic disk, the head slider is moved with the actuator while being raised over the surface of the rotating magnetic disk and the head slider is positioned on the predetermined track of the magnetic disk.

Specifically, a data zone is formed in the magnetic disk, and the magnetic head is moved between the innermost position of the data zone of the disk and the outermost position of the data zone of the disk by the actuator. For example, this is known from Japanese Laid-Open Patent Application No. 2001-035103.

On the other hand, when the magnetic disk device is in the non-operating state, the head slider is located on the CSS zone which is formed in the surface of the magnetic disk. Moreover, the rotation of the magnetic disk is stopped when the magnetic disk device is in the non-operating state, the air flow which serves to raise the head slider is not created, and the head slider is in contact with the CSS zone of the disk.

The CSS zone may be formed at either the disk inner peripheral position that is located inside the innermost position of the data zone of the magnetic disk, or the disk outer peripheral position that is located outside the outermost position of the data zone of the magnetic disk. Usually, the CSS zone is formed at the disk inner position.

A description will now be given of a conventional magnetic head device 100 by using FIG. 1 through FIG. 7.

FIG. 1 is a plan view of the conventional magnetic head device 100 when the head slider is located in the innermost position of the data zone of a magnetic disk. FIG. 2 is a plan view of the conventional magnetic head device 100 when the head slider is located in the outermost position of the data zone of the magnetic disk. Only the portion of the conventional magnetic head device 100 near the actuator 122 is illustrated.

As shown in FIG. 1 and FIG. 2, the actuator 122 which supports the head slider 104 on which the magnetic head is carried is rotatably supported on the supporting shaft 140 such that the actuator 122 is capable of being swung around the center of the supporting shaft 140.

The head slider 104 is formed with the support arm 124 and the support spring 125 in the front-end portion of the actuator 122 which is located in the front direction from the supporting shaft 140.

On the other hand, in the rear-end portion of the actuator 122 which is located in the rear direction from the supporting shaft 140, the coil arm 152 is formed with the actuator 122. The voice coil 151 is mounted on the coil arm 152.

As shown in FIG. 4, the voice coil 151 is provided so that the voice coil 151 is located in the magnetic field which is created with the upper magnet 156 provided on the undersurface of the upper yoke 154 and the lower magnet 155 provided on the upper surface of the lower yoke 153.

The voice-coil motor (VCM) 123 is constituted to swing the actuator 122 by means of the voice coil 151, the lower yoke 153, the upper yoke 154, the lower magnet 155, and the upper magnet 156.

Moreover, the magnetic disk 101 is rotated at the predetermined rotational speed by the spindle motor 112.

The data zone 132 is formed in the magnetic disk 101. Therefore, the head slider 104 is moved between the outermost position "Po" of the data zone 132 of the disk and the innermost position "Pi" of the data zone 132 of the disk. Moreover, the CSS zone 131 is further formed in the disk inner peripheral position that is located inside the innermost position Pi of the magnetic disk 101.

FIG. 3 is an enlarged view of the actuator 122 which is provided in the conventional magnetic head device 100. As shown in FIG. 3, the voice coil 151 which constitutes part of the voice-coil motor 123 is attached to the coil arm 152, and the voice coil 151 is arranged in a generally trapezoidal configuration. The actuator 122 of FIG. 3 is provided so that the intersection of the extension lines (indicated by the arrows B1 and B2 in FIG. 3) of the side section coils 151A and 151B of the voice coil 151 is in agreement with the rotation center (or the center of the supporting shaft 140) of the actuator 122.

FIG. 6 shows the composition of the upper and lower magnets 155 and 156 which constitute part of the voice-coil motor 123 in the conventional magnetic head device 100. In FIG. 6, only the lower magnet 155 is shown for the sake of convenience of illustration, but the upper magnet 156 which has the same composition as the lower magnet 155 is also provided.

The lower magnet 155 is composed of the north-pole magnet section 155N and the south-pole magnet section 155S, and this north-pole magnet section 155N and this south-pole magnet section 155S confront each other (hereinafter, the position where the north-pole magnet section 155N and the south-pole magnet section 155S confront each other is called the magnetization center 158).

Conventionally, the magnet 155 is provided such that the north-pole magnet section 155N and the south-pole magnet section 155S are arranged in a symmetrical formation with respect to the magnetization center 158. That is, the deviation (which is indicated as the rotational angle TN in FIG. 6) of the right side section of the lower magnet 155 from the magnetization center 158 and the deviation (which is indicated as the rotational angle TS in FIG. 6) of the left side section of the lower magnet 155 from the magnetization center 158 are equal to each other (TN=TS).

In addition, the stoppers 127A and 127B are arranged at both the side positions of the voice-coil motor 123, and the voice-coil motor 123 is provided to prevent the excessive swinging of the actuator 122 around the center of the supporting shaft 140 to exceed the predetermined stop position.

As shown in FIG. 4, the lower magnet 155 and the upper magnet 156 are arranged so that the north-pole magnet section 155N of the lower magnet 155 and the south-pole magnet section 156S of the upper magnet 156 are opposed to each other, and the south-pole magnet section 155S of the lower magnet 155 and the north-pole magnet section 156N of the upper magnet 156 are opposed to each other.

For this reason, fundamentally, the perpendicular magnetism in the vertical direction in FIG. 4 is created between the lower magnet 155 and the upper magnet 156. When the voice coil 151 is located within this perpendicular magnetism, the force (the driving force) in the horizontal direction in FIG. 4 occurs on the voice coil 151 according to Fleming's left-hand rule. The actuator 122 is swung around the center of the supporting shaft 140 in accordance with this driving force.

FIG. 5 is an enlarged view of the magnetization centers 158 and 159 of the upper and lower magnets 155 and 156. In FIG. 5, the arrow indicates the line of the magnetic force of the magnetism generated with the magnets 155 and 156.

As is apparent form FIG. 5, in the vicinity of the magnetization centers 158 and 159 of the magnets 155 and 156, the lines of the magnetic force are not formed exactly in the vertical direction (or the vertical direction in FIG. 5), and the magnetic field is slightly inclined to the vertical direction.

Therefore, when the voice coil 151 passes through the region where this inclined magnetic field is formed, the driving force generated according to Fleming's left-hand rule may contain not only the component in the horizontal direction but also the component inclined to the vertical direction (hereinafter, such a component of the driving force will be called the unnecessary driving force). Therefore, when the unnecessary driving force is applied to the voice coil 151, some vibration may occur in the actuator 22.

In the conventional magnetic head device 100, as shown in FIG. 1, when the head slider 104 is located at the innermost position Pi of the data zone, the center C of the voice coil 151 is deviated slightly upward from the magnetization center 158 (the angle "T1$i$" in FIG. 1 indicates the amount of deviation).

Moreover, as shown in FIG. 2, when the head slider 104 is located at the outermost position Po of the data zone, the center C of the voice coil 151 is deviated slightly downward from the magnetization center 158 (the angle "T1$o$" in FIG. 2 indicates the amount of deviation).

The conventional magnetic head device 100 is provided such that these amounts of deviation are set to meet the condition: T1$o$>T1$i$. That is, the conventional magnetic head device 100 is provided such that, when the head slider 104 is located at the innermost position Pi, the right side section coil 151A (which is shown in FIG. 7) is located nearer to the magnetization center 158 than the left side section coil 151B.

FIG. 7 is a diagram for explaining the problem of the conventional magnetic head device 100.

In FIG. 7, both the position (indicated by the solid line) of the voice coil 151 on the magnet 55 when the head slider 104 is located at the innermost position Pi, and the position (indicated by the one-dot chain line) of the voice coil 151 when the head slider 104 is located at the outermost position Po are shown.

As shown in FIG. 7, the deviation (T2$o$) between the magnetization center 158 and the side section coil 151A when the head slider 104 is located at the outermost position Po is smaller than the deviation (T2$i$) between the magnetization center 158 and the side section coil 151B of the voice coil 151 when the head slider 104 is located at the innermost position Pi (T2$i$>T2$o$).

Thus, in the conventional magnetic head device 100, when the head slider 104 is located at the outermost position Po, the side section coil 151A is located within the region in which the lines of magnetic force generated near the magnetization center 158 are inclined to the vertical direction.

For this reason, in addition to the horizontal force (the driving force for the actuator 122), the unnecessary driving force will be applied to the side section coil 151A, and some vibrations occur on the actuator 122.

Thus, when the vibrations occur on the actuator 122, the head slider 104 may be impacted with the magnetic disk 101. Hence, the problem arises in that there is the possibility that the information recorded in the data zone 132 may be damaged in the worst case.

SUMMARY OF THE INVENTION

An object of the present invention is to provide an improved magnetic disk device in which the above-mentioned problems are eliminated.

Another object of the present invention is to provide a magnetic disk device which is capable of preventing the occurrence of vibrations in the actuator.

The above-mentioned objects of the present invention are achieved by a magnetic disk device comprising: a magnetic disk in which a data zone is formed; an actuator having a voice coil and a head slider carrying a magnetic head, the actuator being swung to move the magnetic head over the disk between an innermost position of the data zone and an outermost position of the data zone; and a magnet having a magnetization center and opposed to the voice coil so that a voice-coil motor which swings the actuator is formed, the magnet having a north pole and a south pole confronting each other via the magnetization center, wherein the magnetic disk device is provided so that a deviation of a center of the voice coil from the magnetization center when the magnetic head is in the innermost position of the data zone is substantially equal to a deviation of the center of the voice coil from the magnetization center when the magnetic head is in the outermost position of the data zone.

The above-mentioned objects of the present invention are achieved by a magnetic disk device comprising: a magnetic disk in which a data zone is formed; an actuator having a voice coil and a head slider carrying a magnetic head, the actuator being swung to move the magnetic head over the disk between an innermost position of the data zone and an outermost position of the data zone; and a magnet having a magnetization center and opposed to the voice coil so that a voice coil motor which swings the actuator is formed, the magnet having a north pole and a south pole confronting each other via the magnetization center, wherein the magnetic disk device is provided so that a position of a center of the voice coil from the magnetization center when the magnetic head is in the center between the innermost position and the outermost position of the data zone is substantially equal to a position of the magnetization center of the magnet.

The above-mentioned objects of the present invention are achieved by a magnetic disk device comprising: a magnetic disk in which a data zone is formed; an actuator having a voice coil and a head slider carrying a magnetic head, the actuator being swung to move the magnetic head over the disk between an innermost position of the data zone and an outermost position of the data zone wherein the voice coil includes first and second side section coils; and a magnet having a magnetization center and opposed to the voice coil so that a voice coil motor which swings the actuator is formed, the magnet having a north pole and a south pole confronting each other via the magnetization center, wherein the magnetic disk device is provided so that a deviation between the magnetization center and one of the first and second side section coils nearer to the magnetization center when the magnetic head is in the innermost position of the data zone is substantially equal to a deviation between the magnetization center and the other of the first and second side section coils nearer to the magnetization center when the magnetic head is in the outermost position of the data zone.

According to the present invention, it is possible to possible to prevent the decreasing or increasing of the deviation between the magnetization center and the center of the voice coil (which constitutes part of the voice-coil motor) when the magnetic head is located at the innermost position of the data zone or the outermost position of the data zone. It is possible for the magnetic disk device of the present invention to prevent that the magnet driving force of the magnet in the inclined direction from being applied to the voice coil. It is therefore possible to prevent the occurrence of vibrations in the actuator.

Moreover, the magnetic disk device of the present invention may be provided so that the north pole and the south pole of the magnet are arranged in an asymmetrical formation about the magnetization center.

Moreover, the above-mentioned objects of the present invention are achieved by a magnetic disk device comprising: a magnetic disk in which a data zone is formed; an actuator having a voice coil and a head slider carrying a magnetic head, the actuator being swung around a center to move the magnetic head over the disk between an innermost position of the data zone and an outermost position of the data zone; and a magnet having a magnetization center and opposed to the voice coil so that a voice coil motor which swings the actuator is formed, the magnet having a north pole and a south pole confronting each other via the magnetization center, wherein the voice coil is arranged in a generally trapezoidal configuration and includes first and second side section coils, and the magnetic disk device is provided so that an intersection of extension lines of the first and second side section coils is deviated from the center of the swinging of the actuator to a location where the magnetic head is arranged.

In the case of the conventional magnetic head device, the voice coil is arranged in a generally trapezoidal configuration and the intersection of the extension lines of the side section coils of the voice coil is in agreement with the rotation center of the actuator. In contrast, according to the present invention, the magnetic disk device is provided so that the intersection of the extension lines of the first and second side section coils is deviated from the center of the swinging of the actuator to a location where the magnetic head is arranged. Therefore, it is possible to prevent the decreasing or increasing of the deviation between the voice coil and the magnetization center.

For this reason, it is possible for the present invention to prevent that the magnetism of the magnet in the inclined direction to the vertical direction be applied to the voice coil, and therefore it is possible to prevent the occurrence of vibrations in the actuator.

According to the magnetic disk device of the present invention, it is possible to prevent the occurrence of vibrations in the actuator.

BRIEF DESCRIPTION OF THE DRAWINGS

Other objects, features and advantages of the present invention will be apparent from the following detailed description when read in conjunction with the accompanying drawings.

DETAILED DESCRIPTION OF PREFERRED EMBODIMENTS

A description will now be given of the magnetic disk device 10 of the first preferred embodiment of the invention using FIG. 8 through FIG. 11.

Figure 8:
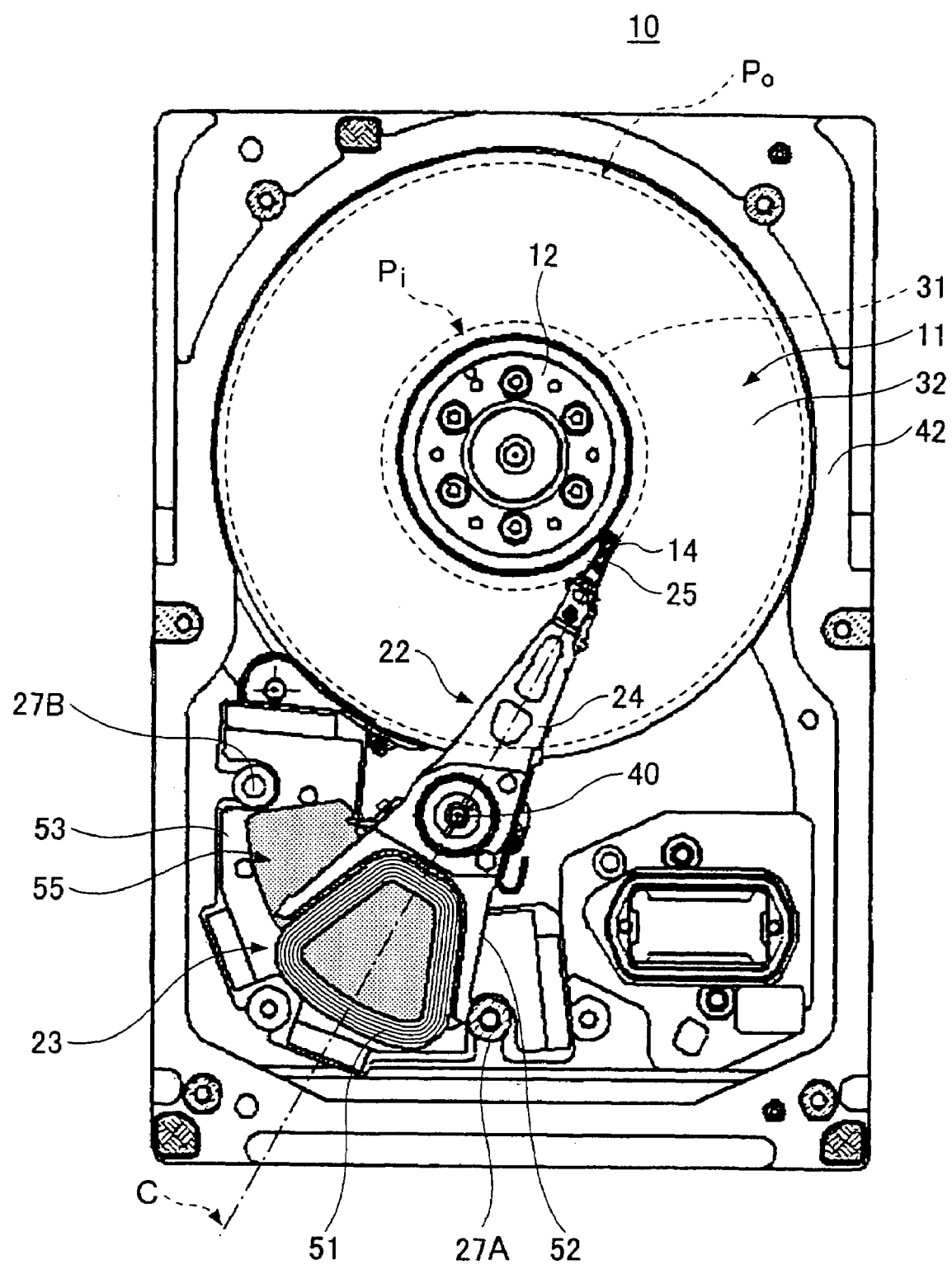
FIG. 8 is a plan view of the magnetic disk device in one preferred embodiment of the present invention.
Figure 9:
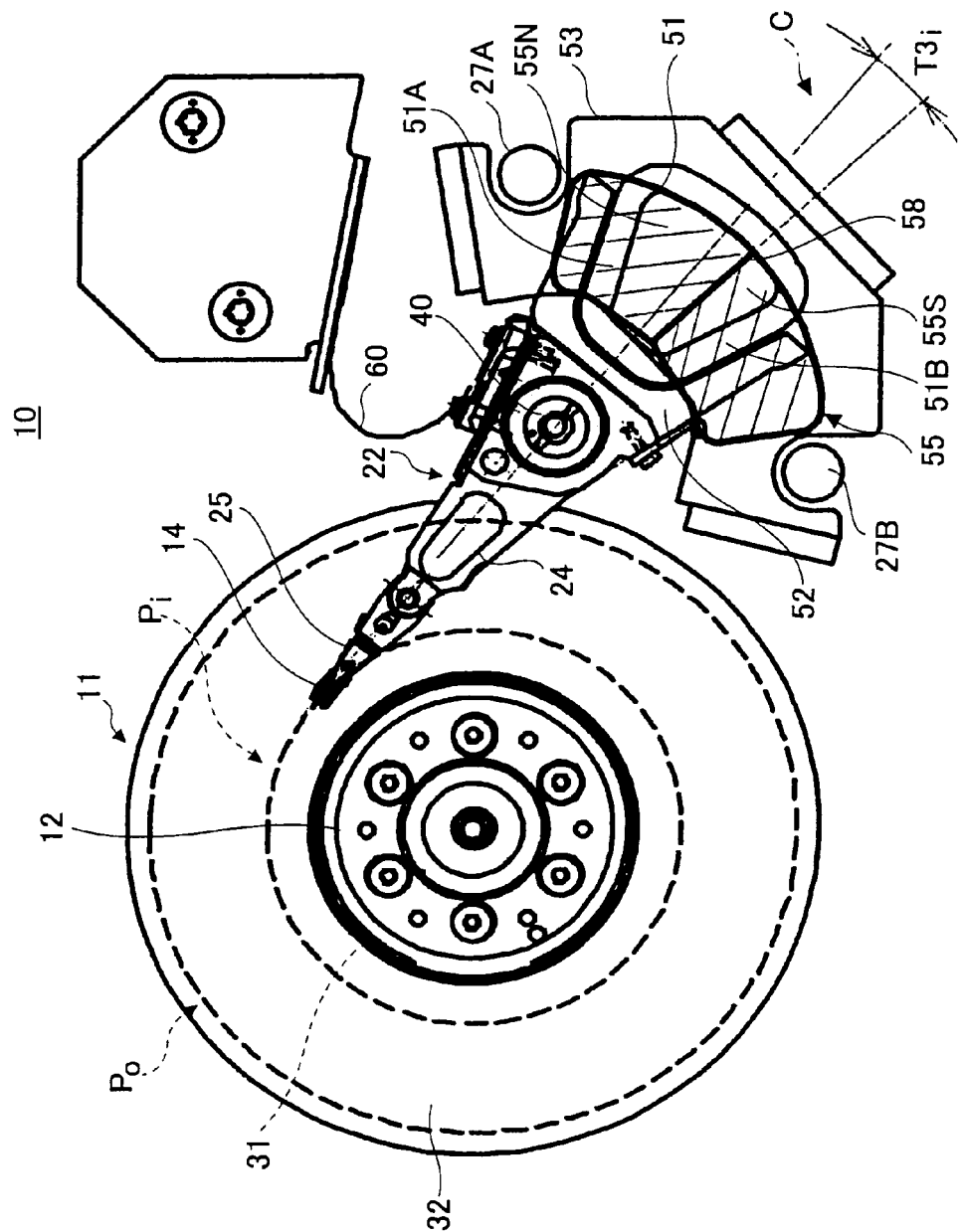
FIG. 9 is an enlarged plan view of the actuator in the magnetic disk device of the first preferred embodiment of the invention when the head slider is located in the innermost position of the data zone of the magnetic disk.
Figure 10:
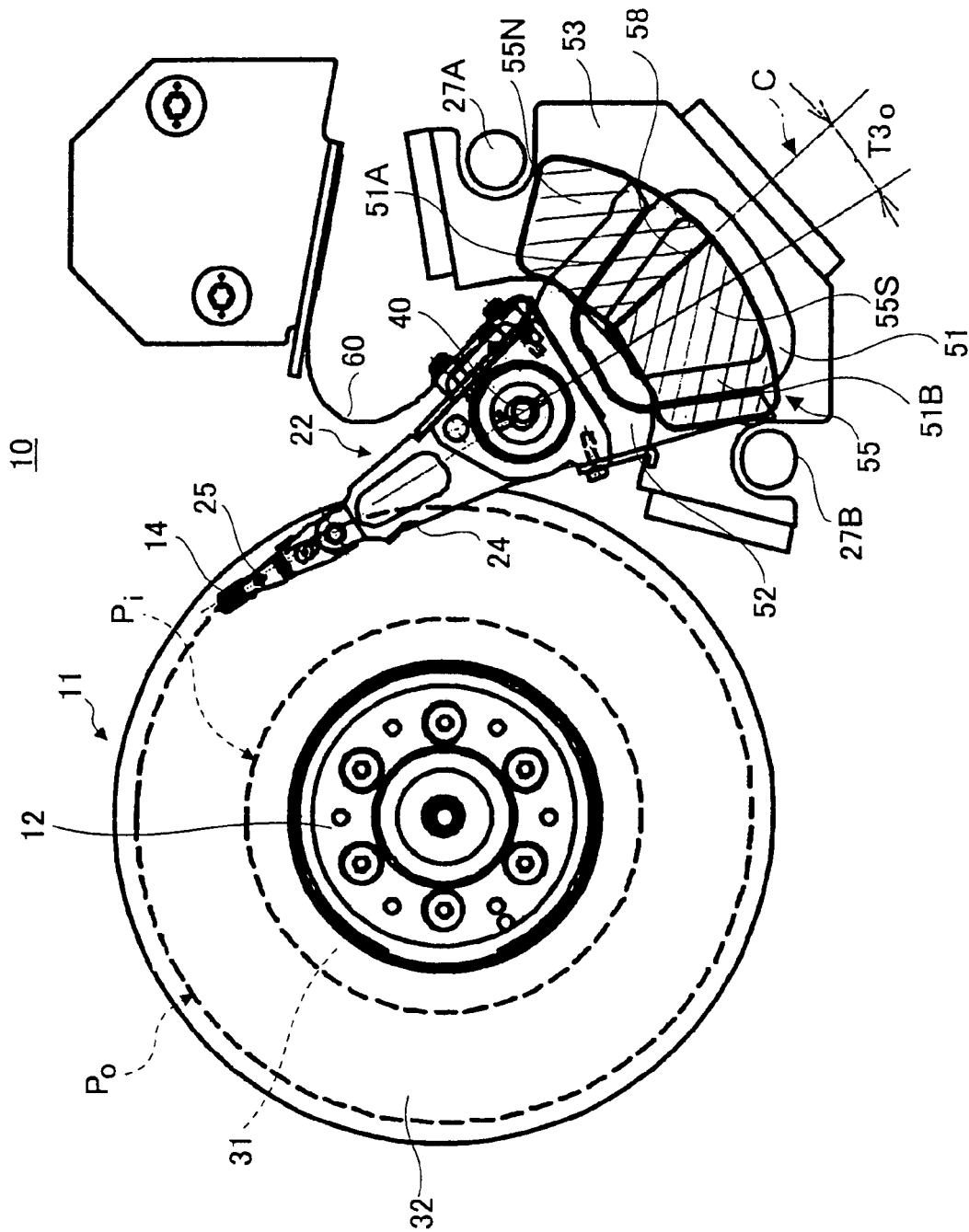
FIG. 10 is an enlarged plan view of the actuator in the magnetic disk device of the first preferred embodiment when the head slider is located in the outermost position of the data zone of the magnetic disk.

FIG. 8 is a plan view of the magnetic disk device 10 of the present embodiment. FIG. 9 is an enlarged plan view of the actuator 22 of the present embodiment when the head slider is located in the innermost position of the data zone of the magnetic disk. FIG. 10 is an enlarged plan view of the actuator 22 of the first preferred embodiment when the head slider is located in the outermost position of the data zone of the magnetic disk.

As shown in FIG. 8, the magnetic disk device 10 is provided with the enclosure including the covering (not shown) and the base 42. The enclosure is configured to contain the magnetic disk 11 which is the data recording medium, the spindle motor 12 which rotates the magnetic disk 11, the actuator 22 on which the head slider 14 carrying the magnetic head is mounted, and the voice-coil motor (VCM) 23 which swings the actuator 22 around the center of the supporting shaft 40.

The magnetic disk 11 is fixed to the rotor section of the spindle motor 12. The rotation driving of the magnetic disk 11 is performed by the spindle motor 12 at the time of operation of the magnetic disk device 10 (or at the time of recording/reproduction processing), and the rotation of the magnetic disk 11 is stopped at the time of non-operation of the magnetic disk device 10.

Moreover, the CSS (Contact Start Stop) method is used for the magnetic disk device 10 of the present embodiment. For this reason, in the non-operating state of the magnetic disk device 10, the head slider 14 (the magnetic head) is in contact with the magnetic disk 11. Therefore, the data zone 32 in which the tracks containing the data and the servo information recorded therein are arranged in the shape of a concentric circle, and the stop region (or the CSS zone) 31 in which the head slider 14 is evacuated when the magnetic disk drive is in the non-operating state are formed in the surface of the magnetic disk 11.

In the following description, the innermost position (or the boundary position with the CSS zone 31) of the data zone 32 will be called the innermost position Pi, and the outermost position of the data zone 32 will be called the outermost position Po.

Moreover, in the present embodiment, the CSS zone 31 is formed in the magnetic disk 11 inside the innermost position of the data zone 32. Alternatively, the CSS zone may be formed in the magnetic disk 11 outside the outermost position of the data zone 32. Furthermore, in the present embodiment, the number of magnetic disks provided in the magnetic disk device 10 is one. Alternatively, a plurality of magnetic disks may be provided in the magnetic disk device of the present invention.

The actuator 22 is rotatably supported on the supporting shaft 40, which is arranged on the base 42, such that the actuator 22 is capable of being swung around the center of the supporting shaft 40. The actuator 22 includes the support arm 24 and the coil arm 52, and the support arm 24 and the coil arm 52 are arranged so that they are opposed to each other on both the sides of the supporting shaft 40.

The support spring 25 which exerts spring pressure onto the head slider 14 is attached to the leading edge of the support arm 24.

The head slider 14 is arranged so that the head slider 14 is opposed to the magnetic disk 11. The magnetic head (not shown) is attached to the head slider 14, and this magnetic head functions to record the data which is supplied from the control unit (which is not illustrated) onto the track on the surface of the magnetic disk 11, and read out the data recorded in the track and send the read-data signal to the control unit.

The head slider 14 is in contact with the CSS zone 31 in the disk inner region of the magnetic disk 11 when the magnetic disk device 10 does not operate, and the head slider 14 is raised over the surface of the rotating magnetic disk 11 when the magnetic disk device 10 is in the operating state.

The voice-coil motor (VCM) 23 is comprised of the upper magnet 56 provided on the undersurface of the upper yoke 54, the lower magnet 55 provided on the upper surface of the lower yoke 53, the voice coil 51 provided in the coil arm 52, the lower yoke 53, and the upper yoke 54.

Moreover, the lower magnet 55 is comprised of the north pole magnet section 55N and the south pole magnet section 55S, and the upper magnet 56 is comprised of the north pole magnet section 56N and the south pole magnet section 56S.

And the north pole magnet section 55N and the south pole magnet section 55S confront each other in the direction of the surface thereof, and the magnetization center 58 is formed at the boundary portion between the sections 55N and 55S.

Similarly, the north pole magnet section 56N and the south pole magnet section 56S confront each other in the direction of the surface thereof, and the magnetization center 59 is formed at the boundary portion between the sections 56N and 56S.

In addition, for the sake of convenience of illustration, in FIG. 8 through FIG. 11, the illustration of the upper yoke 54 and the upper magnet 56 in the present embodiment will be omitted.

Moreover, unless otherwise specified, in the following explanation, the lower and upper yokes 53 and 54 will be referred to as the yoke 53 collectively, and the lower and upper magnets 55 and 56 will be referred to as the magnet 55 collectively.

In the above composition of the magnetic disk device 10, the drive current is supplied to the voice coil 51 from the control unit (not illustrated). The voice coil 51 is arranged in a generally trapezoidal configuration, and this voice coil 51 is attached to the coil arm 52. Especially in the present embodiment, the two side sectional coil portions of the voice coil 51 are called the side section coils 51A and 51B. The voice coil 51 in the present embodiment is provided so that the voice coil 51 is opposed to the magnet 55 which is arranged on the yoke 53.

Next, the detailed composition of the voice-coil motor 23 in the present embodiment will be explained using FIG. 9 and FIG. 10.

When the head slider 14 shown in FIG. 9 is in the innermost position Pi, the center C of the voice coil 51 is located in the position which is deviated upward (in the up direction in the sheet of FIG. 9) by the angle $T3i$ from the magnetization center 58 (in the present embodiment, the angle $T3i$ indicates the amount of deviation).

Moreover, as shown in FIG. 10, when the head slider 14 is in the outermost position Po, the center C of the voice coil 51 is located in the position which is deviated downward (in the down direction in the sheet of FIG. 10) by the angle $T3o$ from the magnetization center 58 (in the present embodiment, the angle $T3o$ indicates the amount of deviation).

The magnetic disk device 10 of the present embodiment is provided so that the angles $T3i$ and $T3o$ which indicate these amounts of deviation) are equal to each other to meet the condition: $T3i=T3o$.

According to the magnetic disk device 10 of the present embodiment, regardless of whether the head slider 14 is located in the innermost position Pi or in the outermost position Po, the deviation between the magnetization center 58 and the side section coil 51A of the voice coil 51 and the deviation between the magnetization center 58 and the side section coil 51B of the voice coil 51 are equal to each other.

Next, a description will be given of the operation of the magnetic disk device 10 of the present embodiment using FIG. 11.

Figure 11:
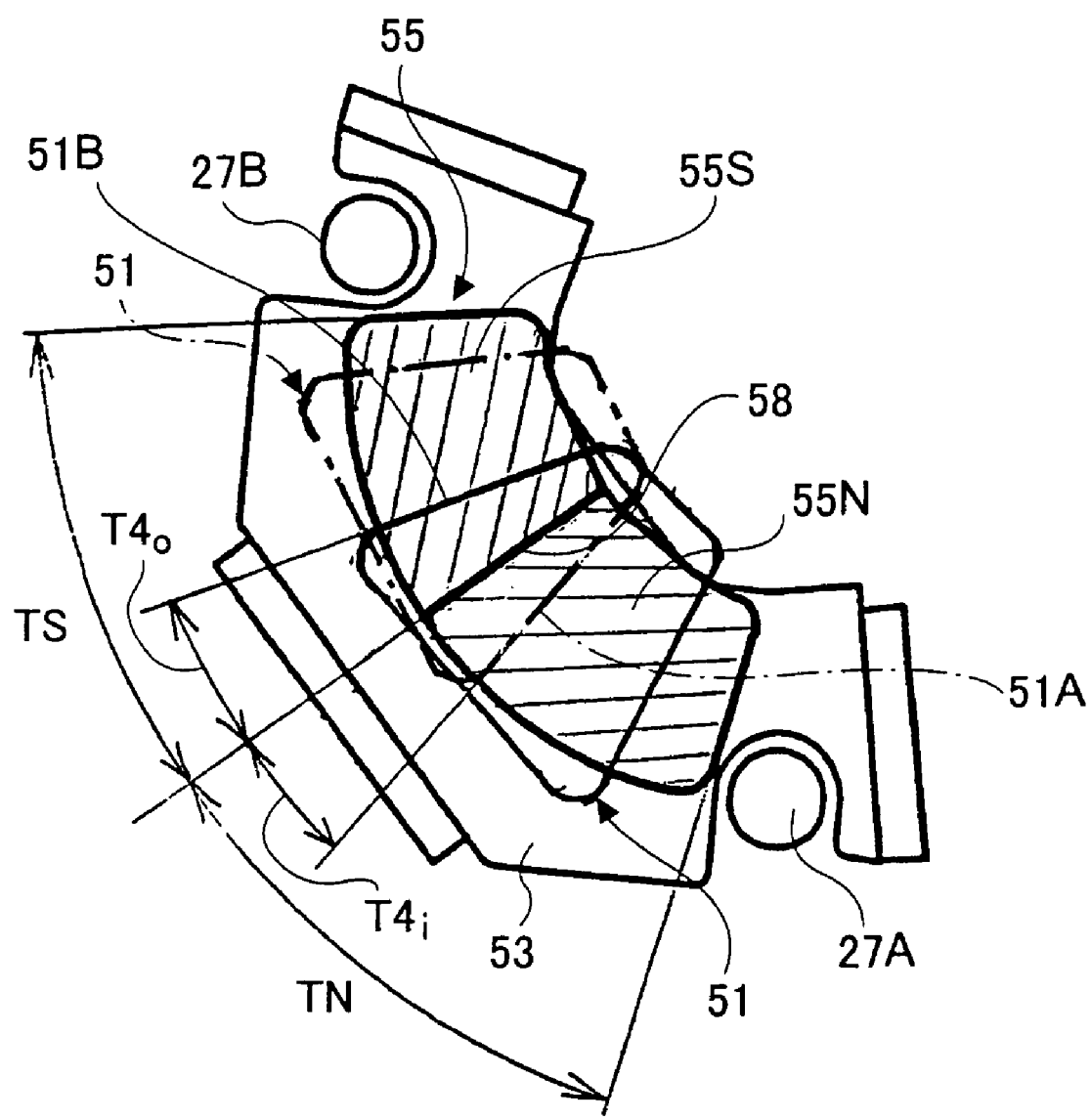
FIG. 11 is a diagram for explaining operation of the magnetic disk device of the first preferred embodiment of the invention.

FIG. 11 shows both the position (indicated by the solid line) of the voice coil 51 on the magnet 55 when the head slider 14 is located in the innermost position Pi, and the position (indicated by the one-dot chain line) of the voice coil 51 when the head slider 14 is located in the outermost position Po.

As shown in FIG. 11, in the present embodiment, the deviation $T4i$ between the side section coil 51B of the voice coil 51 (which is located nearer to the magnetization center 58 when the head slider 14 is located in the innermost position Pi) and the magnetization center 58, and the deviation T4*o* between the side section coil 51A (which is located nearer to the magnetization center 58 when the head slider 14 is located in the outermost position Po) and the magnetization center 58 are equal to each other to meet the condition: T4*i*=T4*o*.

Moreover, although not illustrated, according to the magnetic disk device 10 of the present embodiment, when the head slider 14 is located in the center (or the center between the innermost position Pi and the outermost position Po) of the data zone 32, the position of the center C of the voice coil 51 (the actuator 22) and the position of the magnetization center 58 of the magnet 55 are substantially in agreement with each other.

Therefore, the magnetic disk device 10 of the present embodiment can take the largest deviations between the side section coils 51A and 51B of the voice coil 51 and the magnetization center 58 when the head slider 14 is located in the outermost position Po, and when the head slider 14 is located in the innermost position Pi.

Although the magnetic field is generated at the magnetization center 58 in the inclined direction as described previously, it is possible to prevent the inclined magnetic field from being applied to the voice coil 51 because the increasing or decreasing of the deviations between the magnetization center 58 and the side section coils 51A and 51B can be avoided.

According to the magnetic disk device of the present embodiment, it is possible to prevent the occurrence of vibrations in the actuator 22, and therefore the problem that the information recorded on the data zone 32 may be damaged as in the conventional magnetic head device can be prevented.

Figure 12:
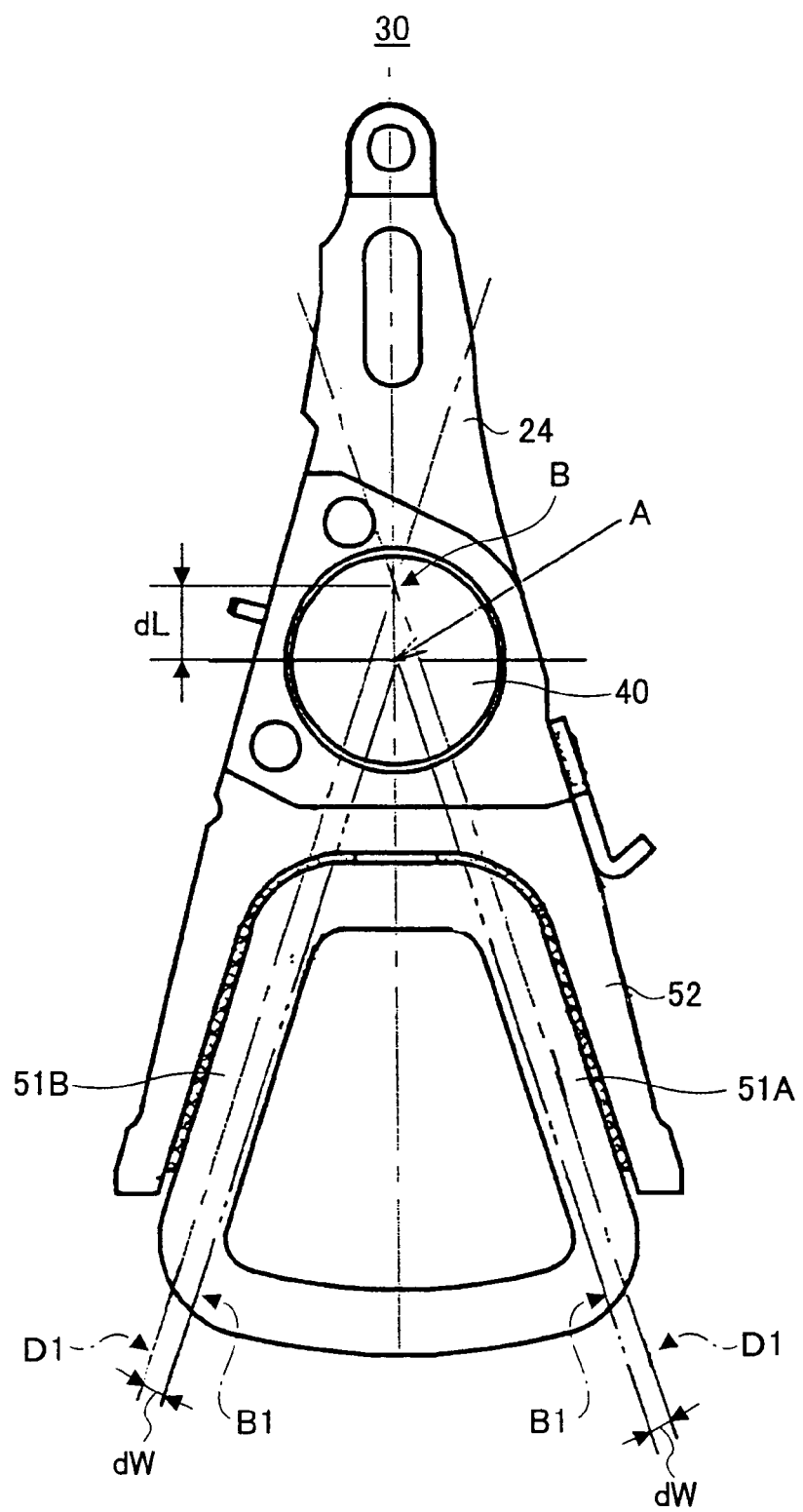
FIG. 12 is an enlarged view of the actuator which is provided in the magnetic disk device of the second preferred embodiment of the invention.

Next, a description will be given of the magnetic disk device of the second preferred embodiment of the invention using FIG. 12. FIG. 12 is an enlarged view of the actuator 30 of the magnetic disk device of the second preferred embodiment.

In the following, only the actuator 30 of the present embodiment will be described. Other composition of the magnetic disk device of the present embodiment except for the actuator 30 is essentially the same as corresponding composition of the magnetic disk device 10 of the first preferred embodiment, and a description thereof will be omitted for the sake of convenience.

Figure 1:
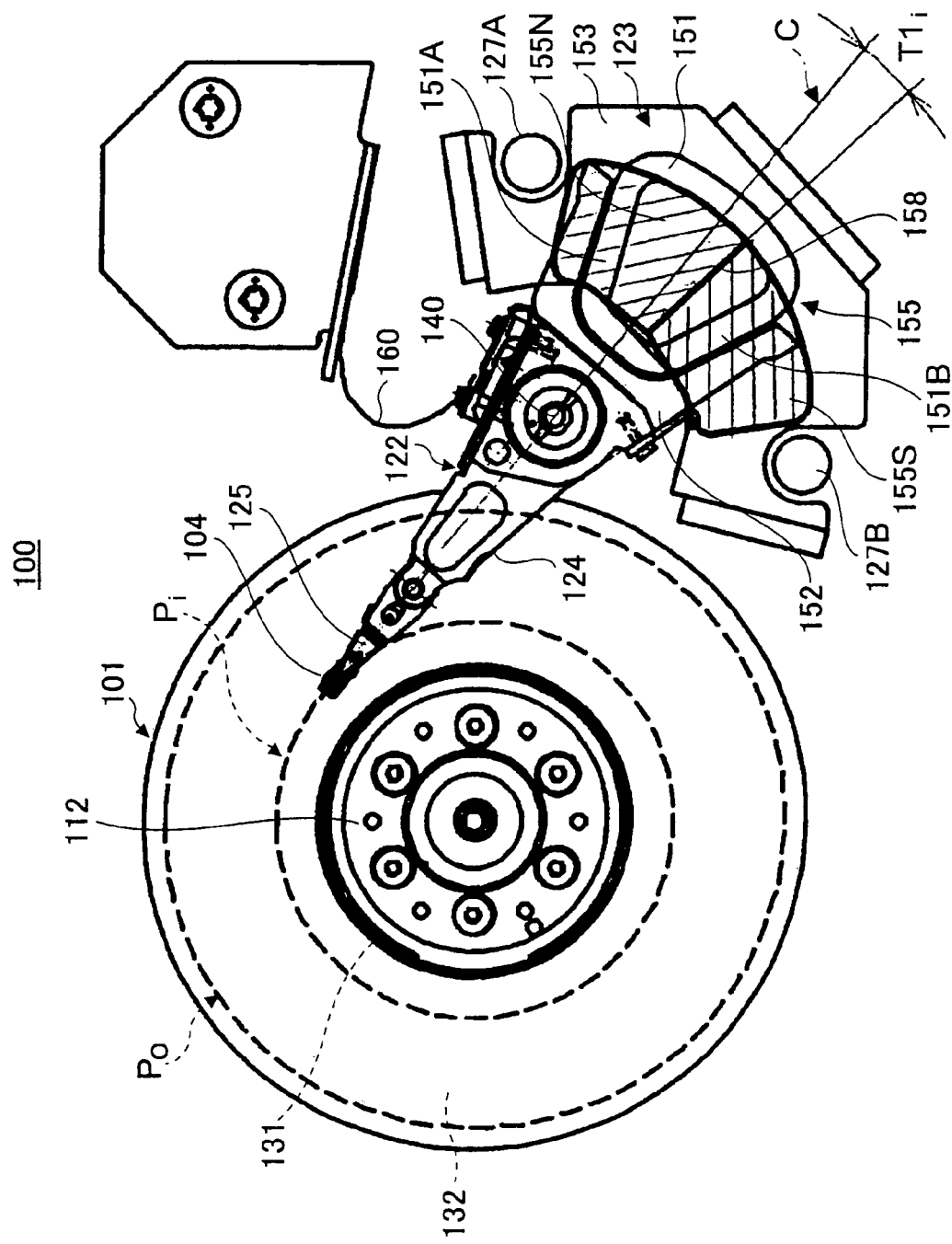
FIG. 1 is a plan view of a conventional magnetic head device when the head slider is located in the innermost position of the data zone of a magnetic disk.
Figure 2:
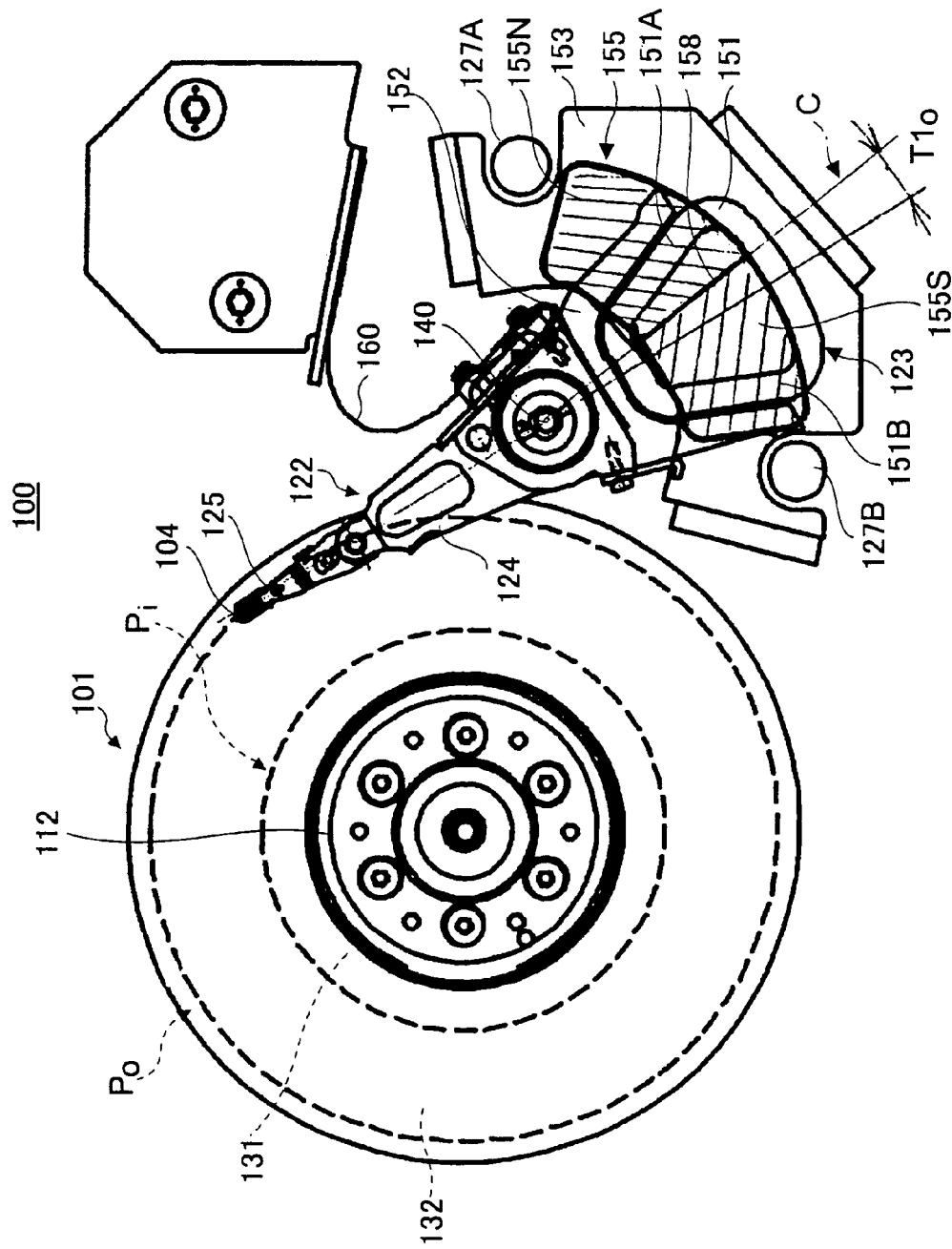
FIG. 2 is a plan view of the conventional magnetic head device when the head slider is located in the outermost position of the data zone of the magnetic disk.
Figure 3:
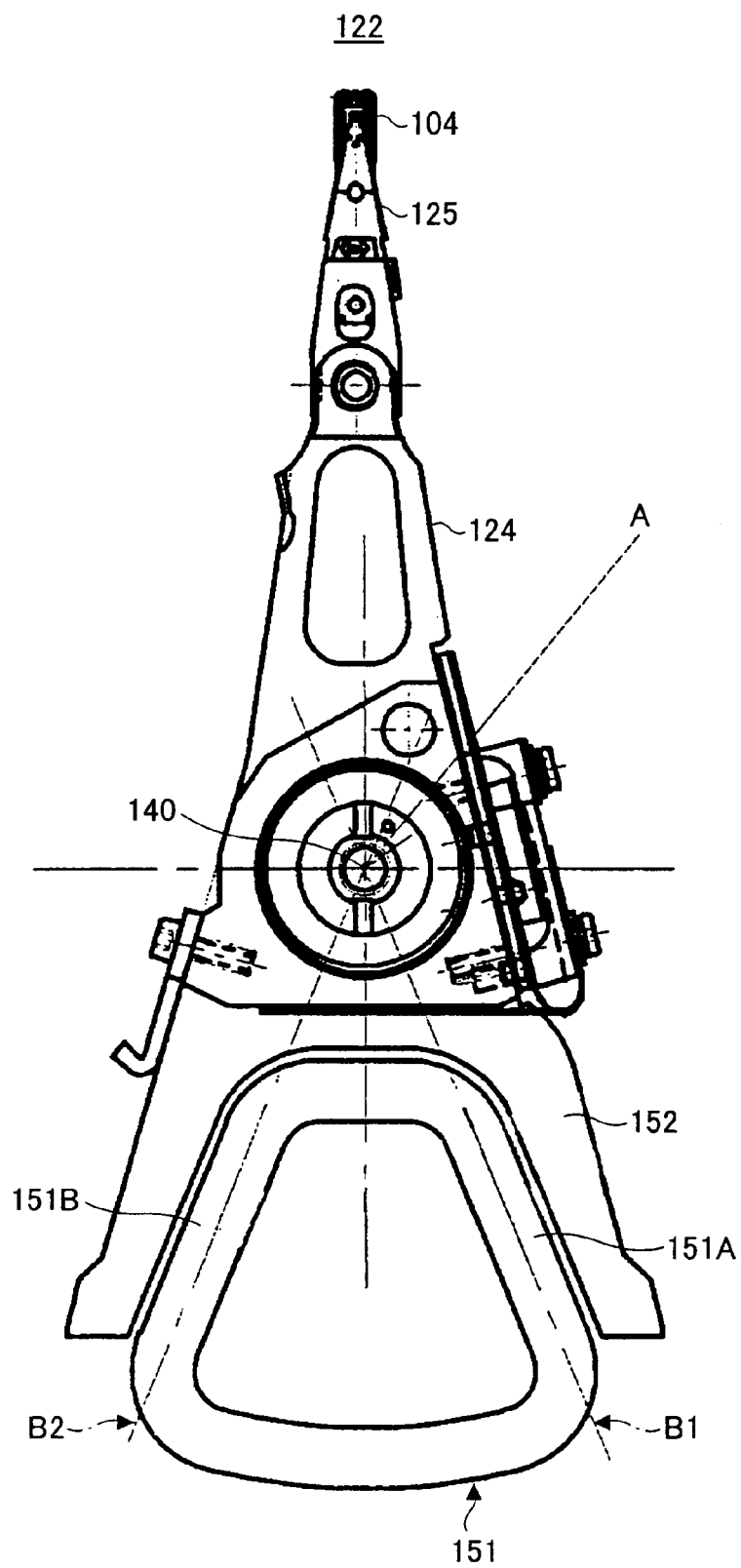
FIG. 3 is an enlarged view of the actuator which is provided in the conventional magnetic head device.
Figure 4:
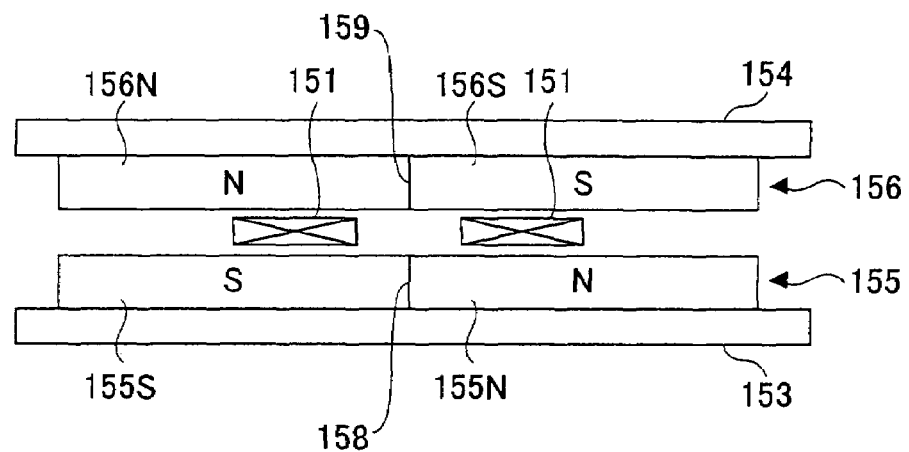
FIG. 4 is a diagram for explaining the composition of the voice-coil motor provided in the conventional magnetic head device.
Figure 5:
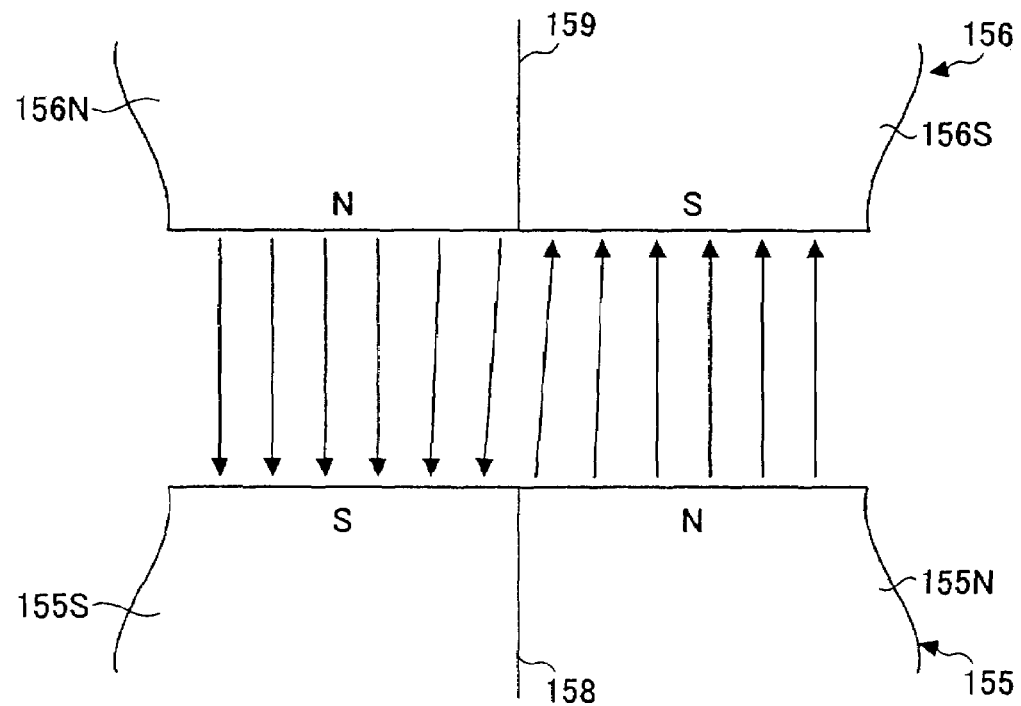
FIG. 5 is an enlarged view of the magnetization centers of the upper and lower magnets.
Figure 6:
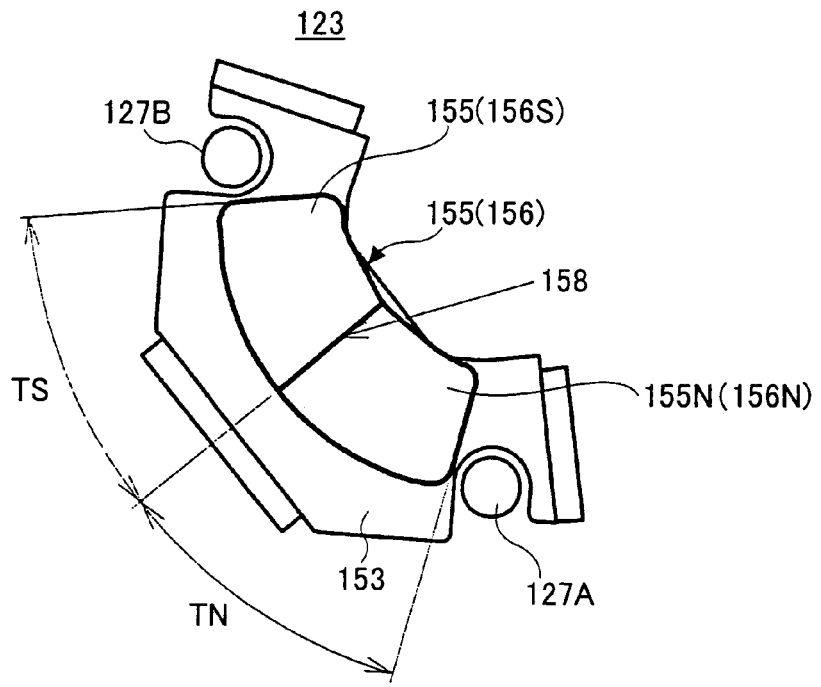
FIG. 6 is a diagram for explaining the composition of the upper and lower magnets in the conventional magnetic head device.
Figure 7:
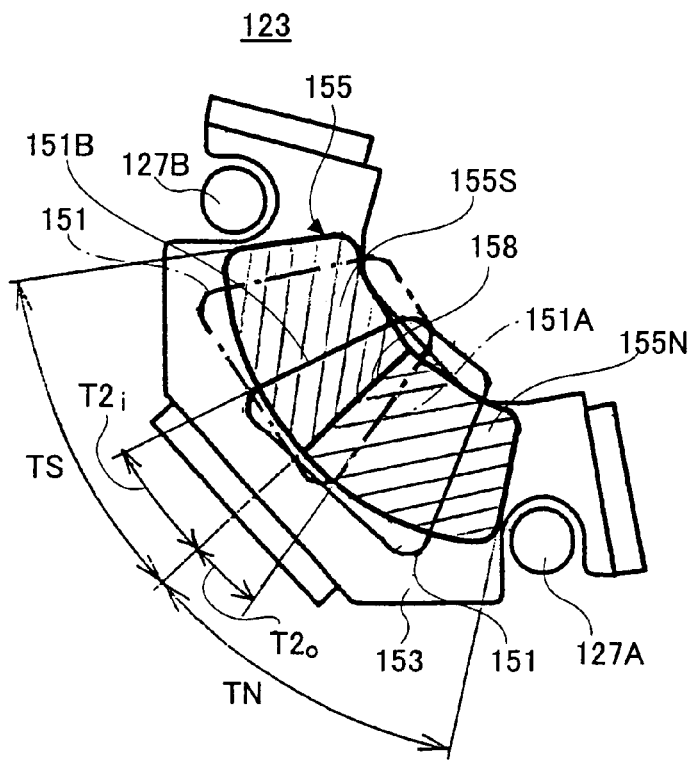
FIG. 7 is a diagram for explaining the problem arising with the conventional magnetic head device.

As previously described with FIG. 3, the conventional magnetic head device 100 is constituted so that the intersection of the extension lines (indicated by the arrows B1 and B2) of the side section coils 151A and 151B of the voice coil 151 is in agreement with the rotation center (or the center of the supporting shaft 140) of the actuator 122.

On the other hand, the magnetic disk device of the present embodiment is constituted so that the intersection B of the extension lines D1 and D2 of the side section coils 51A and 51B of the voice coil 51 is deviated from the swinging center A of the actuator 30 to the location (in the upward direction in FIG. 12) where the magnetic head is arranged.

Specifically, the position of the intersection B of the extension lines of the side section coils 51A and 51B is shifted from the swinging center A of the actuator 30 to the side where the magnetic head is arranged by the distance dL as indicated in FIG. 12.

According to this composition, the positions of the extension lines D1 and D2 of the voice coil 51 can be extended outside in comparison with the positions of the extension lines B1 and B2 of the coil 151 in the conventional device in which the intersection A is located at the swinging center A of the actuator 30.

In the embodiment of FIG. 12, the positions of the extension lines D1 and D2 are outwardly shifted by the distance dW from the positions of the extension lines B1 and B2 in the conventional device.

Accordingly, when the head slider 14 is located in the innermost position Pi of the data zone 32, or the outermost position Po of the data zone 32, it is possible to separate the position of the voice coil 51 (the side section coils 51A and 51B) from the position of the magnetization center 58.

Therefore, it is possible for the magnetic disk device of the present embodiment to prevent that the slanting magnetic field formed near the magnetization center 58 be applied to the voice coil 51 (the side section coils 51A and 51B), thereby preventing the occurrence of vibrations in the actuator 22.

In the present embodiment, the composition in which the upper magnet is provided in the upper yoke and the lower magnet is provided in the lower yoke respectively has been described as an example. Alternatively, the composition may be modified such that the magnet is provided in either the upper yoke or the lower magnet.

The present invention is not limited to the above-described embodiments, and variations and modifications may be made without departing from the scope of the present invention.

What is claimed is:

1. A magnetic disk device comprising:
    a magnetic disk in which a data zone is formed;
    an actuator having a voice coil and a head slider carrying a magnetic head, the actuator being swung to move the magnetic head over the disk between an innermost position of the data zone and an outermost position of the data zone; and
    a magnet having a magnetization center and opposed to the voice coil so that a voice coil motor which swings the actuator is formed, the magnet having a north pole and a south pole confronting each other via the magnetization center,
    wherein the magnetic disk device is arranged so that a deviation of a center of the voice coil from the magnetization center when the magnetic head is in the innermost position of the data zone is made equal to a deviation of the center of the voice coil from the magnetization center when the magnetic head is in the outermost position of the data zone.

2. The magnetic disk device according to claim 1 wherein the north pole and the south pole of the magnet are arranged in an asymmetrical formation about the magnetization center.

3. A magnetic disk device comprising:
    a magnetic disk in which a data zone is formed;
    an actuator having a voice coil and a head slider carrying a magnetic head, the actuator being swung to move the magnetic head over the disk between a First position and a second position; and
    a magnet having a magnetization on center and opposed to the voice coil so that a voice coil motor which swings the actuator is formed, the magnet having a north pole and a south pole confronting each other via the magnetization center,
    wherein the magnetic disk device is arranged so that a deviation of a center of the voice coil from the magnetization center when the magnetic head is in the first position is made equal to a deviation of the center of the voice coil from the magnetization center when the magnetic head is in the second position.

4. The magnetic disk device according to claim 3, wherein the north pole and the south pole of the magnet are arranged in an asymmetrical formation about the magnetization center.

\* \* \* \* \*